United States Patent
Dorfeld et al.

(10) Patent No.: US 8,613,806 B2
(45) Date of Patent: *Dec. 24, 2013

(54) METHOD FOR ELIMINATING CARBON CONTAMINATION OF PLATINUM-CONTAINING COMPONENTS FOR A GLASS MAKING APPARATUS

(75) Inventors: William G. Dorfeld, Salida, CO (US); Susan L. Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/074,133

(22) Filed: Mar. 29, 2011

(65) Prior Publication Data

US 2012/0073326 A1     Mar. 29, 2012

Related U.S. Application Data

(63) Continuation-in-part of application No. 12/871,222, filed on Aug. 30, 2010, now Pat. No. 8,177,114.

(51) Int. Cl.
  *C03B 5/18*   (2006.01)
  *C23C 22/00*  (2006.01)

(52) U.S. Cl.
  USPC .............. 148/208; 65/27; 65/168; 65/178

(58) Field of Classification Search
  USPC .................. 148/208; 65/27, 168, 178
  See application file for complete search history.

(56) References Cited

U.S. PATENT DOCUMENTS

| | | | |
|---|---|---|---|
| 5,415,161 A * | 5/1995 | Ryder | 128/200.23 |
| 5,844,225 A | 12/1998 | Kimock et al. | 235/462.01 |
| 6,379,638 B1 * | 4/2002 | Matacotta et al. | 423/210 |
| 6,405,564 B1 * | 6/2002 | Takei et al. | 65/157 |
| 6,698,244 B1 | 3/2004 | Romer et al. | 65/134.3 |
| 7,141,088 B2 | 11/2006 | Nakatani et al. | 55/523 |
| 7,211,292 B1 | 5/2007 | Budaragin | 427/227 |
| 7,584,632 B2 | 9/2009 | House et al. | 65/134.5 |
| 7,718,221 B2 | 5/2010 | Budaragin et al. | 427/226 |
| 8,114,188 B1 * | 2/2012 | Goller et al. | 75/633 |
| 8,177,114 B2 * | 5/2012 | Dorfeld et al. | 228/101 |
| 2006/0039849 A1 * | 2/2006 | Resasco et al. | 423/447.3 |
| 2006/0051644 A1 * | 3/2006 | Jewulski et al. | 429/32 |
| 2007/0151518 A1 * | 7/2007 | Kato | 118/726 |
| 2010/0083704 A1 | 4/2010 | Grzesik et al. | 65/51 |

FOREIGN PATENT DOCUMENTS

JP   2000128549 A  *  5/2000

OTHER PUBLICATIONS

Machine translation of JP 2000128549, 2000.*

* cited by examiner

*Primary Examiner* — Rebecca Lee
(74) *Attorney, Agent, or Firm* — Kevin M. Able

(57) ABSTRACT

In the formation of sheet material from molten glass, molten glass is formed in a melting furnace and transported through a precious metal delivery system to the forming apparatus. Disclosed herein is a method to mitigate carbon contamination of individual components of the precious metal delivery system prior to and/or during their use. The method involves positioning an oxygen generating material within portions of a precious metal component, and may comprise one or more heat treating steps of the component in an oxygen-containing atmosphere.

12 Claims, 4 Drawing Sheets

METHOD FOR ELIMINATING CARBON CONTAMINATION OF PLATINUM-CONTAINING COMPONENTS FOR A GLASS MAKING APPARATUS

This is a continuation-in-part of U.S. patent application Ser. No. 12/871,222 filed on Aug. 30, 2010 now U.S. Pat. No. 8,177,114, the content of which is relied upon and incorporated herein by reference in its entirety, and the benefit of priority under 35 U.S.C. §120 is hereby claimed.

FIELD

This invention relates to a method for ameliorating the effects of carbon contamination of platinum-containing components used in a glass making apparatus.

BACKGROUND

A glass making apparatus for delivering high quality glass in the manufacture of precision glass articles requires careful attention to the delivery systems. Such precision products can include optical lenses and glass panels for the manufacture of display devices such as televisions, computers, cell phones, etc.

Molten glass delivery systems for high precision products may typically be formed from precious metals, and usually platinum or platinum alloys such as a platinum rhodium alloy. Such precious metals, usually selected from the platinum group of metals, have high melting temperatures, and are less likely to contribute contaminants to the molten glass (melt) flowing through these "platinum" delivery systems. In many instances, individual components of a particular platinum delivery system, a finer for example, or a stirring vessel, are produced by joining multiple subcomponents. For example, a cylindrical tube might be formed by rolling several flat platinum plates into semicircular segments, then welding the segments to form the tube. In another example, stirrers for stirring the molten glass may be formed by welding individual stirring blades to a shaft. Even the shaft may be formed from multiple components.

In spite of the relatively benign behavior of platinum (or platinum alloy) when submerged within the corrosive molten glass, it has been found that some of these platinum components may be contributing to inadvertent contamination of the molten glass with gaseous inclusions, or blisters.

Blisters believed to originate from precious metal components, such as an apparatus for stirring molten glass, have been identified as a significant loss issue in the manufacture of glass sheet for LCD display substrates. The problem is especially prevalent during startup of a melting furnace, but has also been observed mid-campaign. Because the defects constitute greater than about 90% $CO_2$, the underlying problem is believed to be carbon contamination of the components. The carbon contamination may be present in the components as-received from the component manufacturer, or it might be introduced into the component during operation.

The following disclosure addresses treating individual components and/or sub-components prior to and/or during use to mitigate the formation of these gaseous inclusions.

SUMMARY

Disclosed herein are embodiments of methods to produce platinum-containing articles for use in a glass making system that produce little or no carbon diffusion out of the article during use of the article (e.g. during contact of the article with molten glass). Carbon content of the article as low as several ppm may result in the formation of $CO_2$ gas at the interface between the platinum and molten glass that produces bubbles in the molten material that persist, undesirably, into the final glass article. One aspect of internal carbon contamination is the introduction of carbon into sealed cavities produced when an article, such as a stirring rod (stirrer), is fabricated. A number of opportunities exist for this to occur: some stirrer shafts are double walled with the space between the walls sealed by welds, sleeves are used to attach the blade assembly to the shaft and if these are also welded, a continuous cavity can be created where the stirrer blade is attached to the outer wall by the welding. The carbon can come from a variety of sources, but most commonly occurs when carbon containing lubricants are used in the manufacture of platinum-containing sub-assemblies and assemblies. Inadequate cleaning techniques may leave a carbonaceous residue on the surface of the stirrer components before assembly.

Platinum-containing components are often used in delivery systems for transporting the molten material from one location to another, or for processing the molten mass, such as homogenizing the material due to the high temperature resistant capabilities of the metal. Such articles may be formed from platinum, or a platinum alloy, such as, but not limited to platinum-rhodium alloys and platinum-iridium alloys. Conventional cleaning methods, such as washing with detergents, may not remove carbon that diffuses into the body of the platinum article. Therefore, other methods may be employed to eliminate the carbon.

The molten glass may also be referred to as the glass melt or simply "melt". It should be understood that glass as commonly understood comprises a material in an elastic state, and that although the molten material produced by the melter is not at that point truly a glass, it is capable of forming a glass upon cooling, and those skilled in the art of glass making will understand the use of the term. Thus, as used herein, the term "molten glass" will refer to a molten fluid material comprised from inorganic oxide materials, which, when cooled, is capable of forming a glass.

In accordance with one embodiment, a method of making a platinum-containing component used in a glass making system is disclosed comprising providing a first platinum-containing metallic member and a second platinum-containing metallic member, coating at least a portion of either one or both of the first platinum-containing metallic member and the second platinum-containing metallic member with an oxygen generating material (a material capable of releasing oxygen when heated, such as a multivalent oxide material, e.g. an oxide of tin, or nitrate compounds) and joining the first platinum-containing metallic member and the second platinum-containing metallic member to form an assembly, wherein at least a portion of the oxygen generating material is disposed in an interstitial volume between the first platinum-containing metallic member and the second platinum-containing metallic member.

The method may further comprise heating the assembly in a heat treating step to a temperature of at least 1450° C. for a period of time ≥12 hours in an atmosphere comprising oxygen in an amount of at least 20% by volume.

The joining of the first platinum-containing metallic member and the second platinum-containing metallic member can comprise, for example, welding the first platinum-containing metallic member to the second platinum-containing metallic member.

In some instances a venting passage between the interstitial volume and an atmosphere external to the interstitial volume can be provided, and sealing of the vent passage after heat treating may be conducted.

Preferably, the oxygen generating material comprises an oxide of tin, but may be another material releases a gas (e.g. oxygen) when heated. Such materials may be multivalent materials, such as oxides of tin, or, for example, nitrides, such as $KNO_3$.

In another embodiment, a method of removing carbon contamination from a platinum-containing article is described comprising providing a first platinum-containing metallic member and a second platinum-containing metallic member, coating at least a portion of either one or both of the first platinum-containing metallic member and the second platinum-containing metallic member with a multivalent oxide material, joining the first platinum-containing metallic member and the second platinum-containing metallic member to form an assembly, wherein at least a portion of the oxygen generating material is disposed in an interstitial volume between the first platinum-containing metallic member and the second platinum-containing metallic member, forming a vent passage between the interstitial volume and an external atmosphere, heating the assembly in a heat treating step to a temperature of at least 1450° C. for a period of time≥12 hours in an atmosphere comprising oxygen in an amount of at least 20% by volume and sealing the vent passage after the heating step. The coating step may comprise depositing the oxygen generating material as a powder.

The method may further comprise stirring a molten glass material with a stirring apparatus comprising the assembly.

In still another embodiment, a method of removing carbon contamination from a platinum-containing article is presented comprising providing a first platinum-containing metallic member and a second platinum-containing metallic member, coating at least a portion of either one or both of the first platinum-containing metallic member and the second platinum-containing metallic member with tin oxide, joining the first platinum-containing metallic member and the second platinum-containing metallic member to form an assembly, wherein at least a portion of the tin oxide is disposed in an interstitial volume between the first platinum-containing metallic member and the second platinum-containing metallic member and forming a vent passage in the assembly that connects the interstitial volume with an external atmosphere. The tin oxide can be deposited as a powder The method may further comprise heating the assembly in a heat treating step to a temperature of at least 1450° C. for a period of time≥12 hours in an atmosphere comprising at least 20% by volume oxygen. If needed, the vent passage can be sealed after the heating step.

The method may further comprise processing a molten glass material using the assembly. Processing of the molten glass material may include, for example, stirring the molten glass or fining the molten glass.

In another embodiment, a method of removing carbon contamination from an interior volume of a platinum-containing component is disclosed comprising providing a platinum containing component comprising a hollow interior portion and a passage extending between an ambient atmosphere outside the platinum containing component and the hollow interior portion, positioning a gas supply tube into the hollow interior portion through the passage, flowing an oxygen-containing gas through the gas supply tube into the interior hollow portion of the platinum-containing component such that a pressure within the hollow interior portion of the platinum-containing component is greater than a pressure of the ambient atmosphere and heating the platinum containing component to a temperature greater than about 1400° C.

In still another embodiment, a method of removing carbon contamination from an interior volume of a platinum-containing component is described comprising providing a platinum containing component comprising a hollow interior portion and a passage extending between an ambient atmosphere outside the platinum containing component and the hollow interior portion positioning an oxidizing material within the hollow interior portion and heating the platinum containing component to a temperature greater than about 1400° C. such that the oxidizing material reacts with reduced carbon to produce $CO_2$ and a metal or reduced oxide vapor such as SnO.

In still another embodiment, an apparatus for stirring a molten glass material is disclosed comprising a stirrer shaft comprising platinum or a platinum alloy, the stirrer shaft defining a vent passage and including a wall enclosing a hollow interior portion of the stirrer shaft and a gas supply tube extending through the vent passage into the hollow interior portion for supplying a gas to the interior portion of the stirrer shaft.

In yet another embodiment, an apparatus for stirring a molten glass material is described comprising a stirrer shaft comprising platinum or a platinum alloy, the stirrer shaft defining a vent passage and including a wall enclosing a hollow interior portion of the stirrer shaft, a support member extending from an interior portion of the stirrer shaft wall into the hollow interior portion of the stirrer shaft, the support member supporting a refractory container and a thermal radiation shield positioned between the support member and the vent passage. An oxidizing material is provided in the refractory container.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

Figure 1:
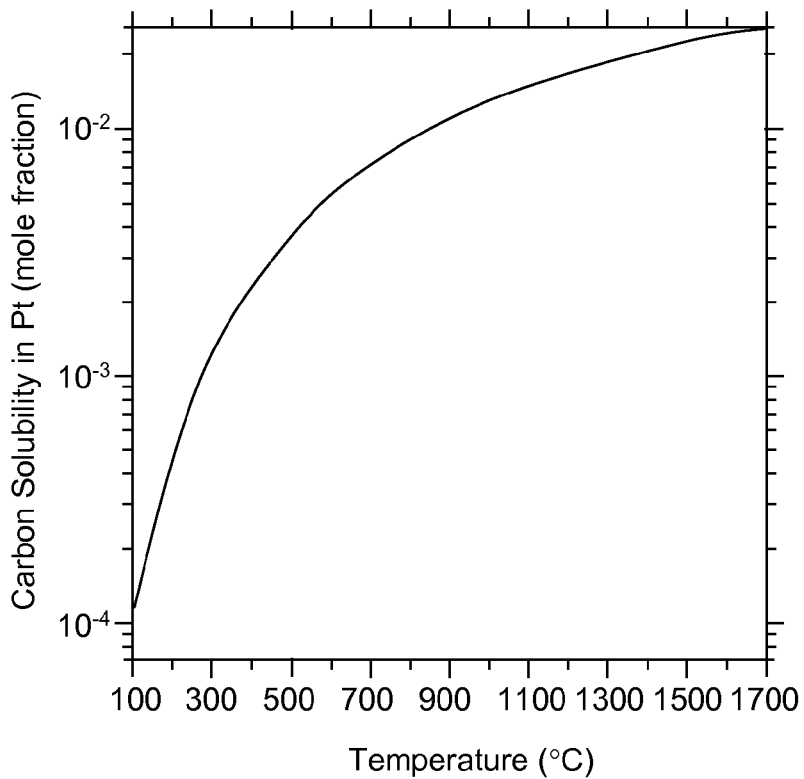
FIG. 1 is a graph showing the solubility of carbon in platinum as a function of temperature.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Many modern glass making systems employ precious metal components that are used to convey and/or process a molten glass material once the material has been formed by melting the batch material. Typical precious metals include metals selected from the platinum group of metals, including platinum, rhodium, iridium, ruthenium, palladium and osmium, and alloys thereof, although the most commonly selected are platinum, rhodium and in some cases iridium for their high melting temperature and good to fair workability.

In spite of their suitability for molten glass process equipment, such precious metal components suffer from several drawbacks. For example, hydrogen permeation is one well-known phenomenon, wherein water contained in the molten glass material can disassociate into its constituent hydrogen and oxygen. The hydrogen diffuses through the precious metal to the surrounding atmosphere, leaving the oxygen in the molten glass material. The oxygen forms small gas bubbles, commonly referred to as "blisters", that may continue entrained throughout the forming process and end up in the finished glass product. For precision glass products these blisters are undesirable.

An example of a precious metal component of a glass making system is a glass stirring apparatus for homogenizing the molten glass material. The development of hollow shaft stirrers was accompanied by the introduction of a vent from the stirrer core to the atmosphere, the rationale being that a sealed volume would lead to unacceptable stress when the trapped gas expanded as the stirrer was brought to operating temperature. Since the stirrer vent system presents a somewhat tortuous path, and the stirrer shaft is quite long and narrow, exchange between the stirrer core and the atmosphere will be slow. Therefore, any carbon-containing material (located either on the radiation shield or at the bottom of the shaft core) can produce a partial pressure of reduced carbon that may lead to CO2 formation on the glass side.

Another source of blisters occurs as a result of carbon that may contaminate isolated areas of the precious metal components. As shown in FIG. 1, carbon is quite soluble in platinum, up to about 0.1% at stirrer operating temperatures, and with no intermediate phases. In addition, the diffusivity of carbon in platinum is reasonably high at stirrer operating temperatures (approximately $10^{-5}$ cm$^2$/s).

Figure 2:
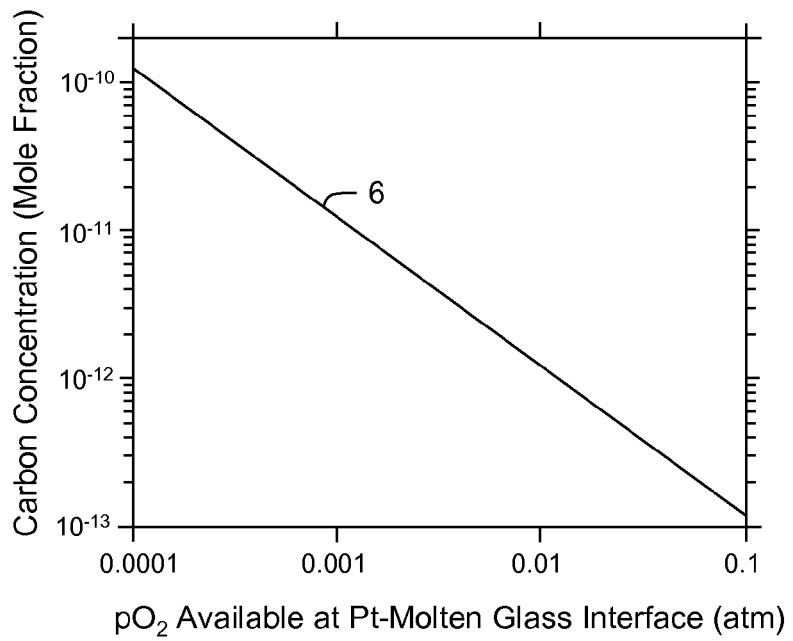
FIG. 2 is a graph showing the minimum concentration of carbon at the surface of a platinum component, such as an apparatus for stirring molten glass, needed to achieve a partial pressure of $CO_2$ ($pCO_2$) equal to 1 atmosphere as a function of the partial pressure of oxygen ($pO_2$) at the platinum-molten glass interface.

There is also a thermo-chemical criterion that must be met for carbon diffusion to be responsible for observed $CO_2$ blisters. To nucleate a $CO_2$ bubble, the partial pressure of $CO_2$ (p$CO_2$) must be greater than about 1 atmosphere. FIG. 2 shows the minimum concentration in mol fraction of carbon in platinum needed to achieve p$CO_2$=1 atm and nucleate a bubble as a function of the partial pressure of oxygen in the glass melt (p$O_2$) at 1425° C. (illustrated by curve 6), a typical stirring apparatus operating temperature.

Figure 3:
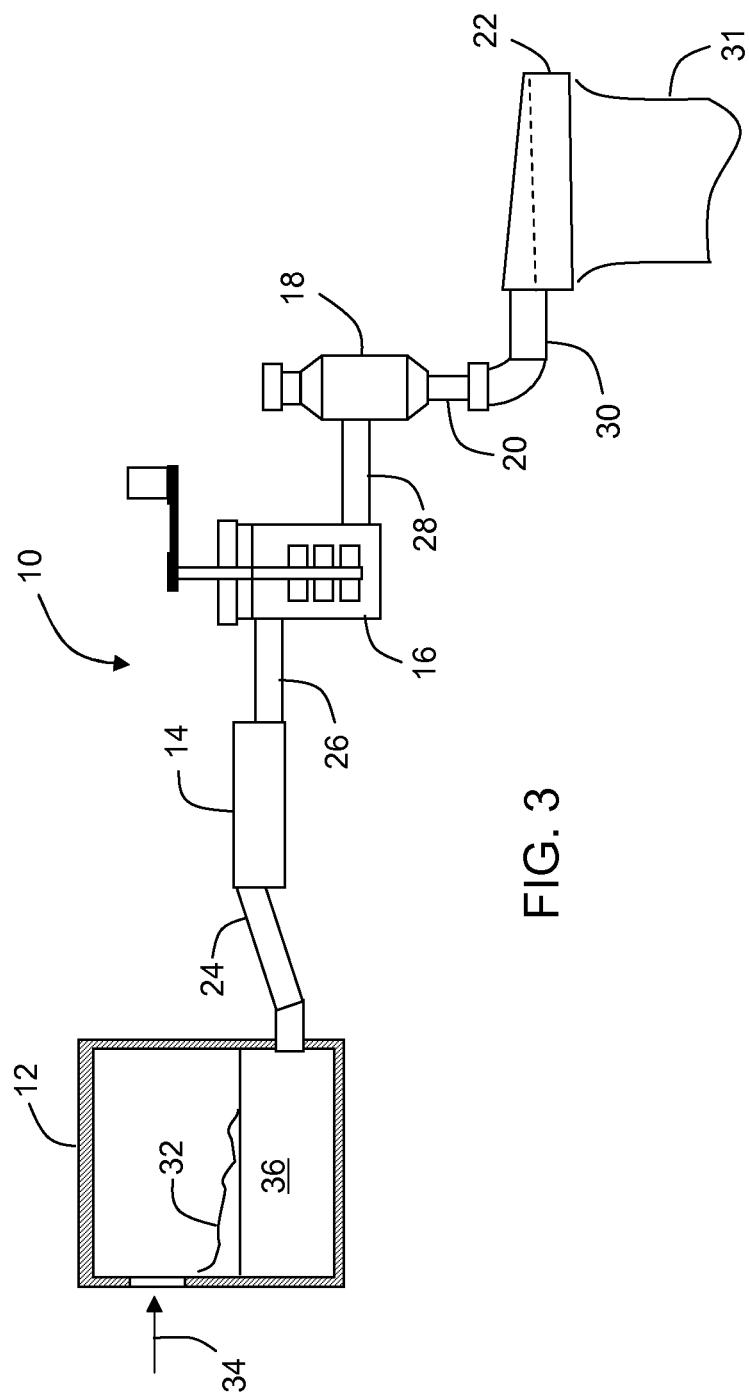
FIG. 3 is an elevational view in partial cross section showing an exemplary fusion downdraw process for the manufacture of glass sheet, and showing the platinum delivery system for transporting molten glass from the melting furnace to the forming body.

Shown in FIG. 3 is a side view of an exemplary glass making apparatus 10 comprising melting furnace or melter 12, finer 14, stirring apparatus 16, collection vessel 18, and downcomer tube 20 for supplying molten glass to a forming body 22 for producing a thin ribbon of glass. Finer 14 is connected to melter 12 through melter to finer connecting tube 24 and to stirring apparatus 16 through connecting tube 26. Collection vessel 18 is connected upstream to stirring apparatus 16 through connecting tube 28. A downcomer tube 20 is connected to collection vessel 18, and supplies molten glass to inlet 30 connected to forming body 22. Melter 12 is typically constructed from a refractory material, such as alumina or zirconia, and is supplied with batch material that is melted by, for example, a gas flame and/or an electric current passed between electrodes in the melter structure. Similarly, forming body 22 is also typically formed from a refractory material. In this instance, glass making apparatus 10 comprises a fusion downdraw system, so named because molten glass (glass melt) delivered to the forming body overflows both sides of the forming body as separate flows, then re-join or fuse at the bottom of the forming body as the molten glass is drawn downward by pulling rollers to produce a thin, pristine ribbon of glass 31. The ribbon may be cut at the bottom of the draw area into individual glass sheets. It should be noted, however, that the forming process itself may be replaced with other forming processes, as it is the delivery system, i.e. those precious metal components between the melter and the forming body, that are the subject of the present disclosure. These components include finer 14, stirring apparatus 16, collection vessel 18, downcomer tube 20, inlet 30 and connecting tubes 24, 26, and 28, and are collectively referred to herein as the platinum system, so-called because each of the components is formed from platinum or a platinum alloy metal such as a platinum rhodium alloy, or coated or clad with platinum or a platinum alloy. Moreover, while the present disclosure is presented in the context of the exemplary platinum system introduced above, the principals and teaching of the present disclosure is applicable any time platinum components are assembled for use in a glass making system. In addition, the present invention is not limited to a fusion glass making system, but may be applied to other glass making processes where a glass melt is formed, such as up-draw processes or float processes.

According to the exemplary fusion glass making system described above, raw batch materials 32 are sourced to the melting furnace (as indicated by arrow 34) where heat is applied to melt the individual constituents of the batch and form the molten glass 36. The batch materials typically include various metal oxides and other additives as required for a specific glass composition. The melter itself is typically formed from a refractory material, for example refractory bricks. Suitable refractory materials include alumina or zirconia. The melting process produces, inter alia, various gases that are entrained into the molten glass and must be removed if a quality product is to be produced from the molten mixture. Thus, a fining step is included. For example, the molten glass can be flowed from melter 12 through connecting tube 24 to finer 14, where the temperature of the molten glass is raised.

The increased temperature both decreases the viscosity of the molten glass, and causes certain fining agents (e.g. multivalent compounds such as arsenic oxide, tin oxide and/or antimony oxide) included in the batch material to release gas, e.g. oxygen. The gas released by the fining agent enters existing bubbles, causing them to grow and therefore rise through the glass melt faster. The increased temperature also results in a decrease in the viscosity of the molten glass that allows the bubbles to rise faster. Fining is achieved when the bubbles rise to a free surface of the molten glass and escape from the melt.

Once the molten glass has been fined, the molten glass is flowed through connecting tube 26 to stirring apparatus 16 comprising stirring vessel 38, stirrer 40 rotatably disposed in the stirring vessel. Molten glass flows into the stirring vessel 38 through the stirring vessel inlet 42 and is stirred by stirrer 40. Stirrer 40 typically includes a stirrer shaft 44 coupled to a motor 46 through a drive mechanism (e.g., chain 48 and sprockets 50) and a coupler 52. Stirrer 40 also includes stirrer blades 54 arranged on the shaft such that the blades are submerged in the molten glass during operation of the stirrer. Stirrer 40 homogenizes the molten glass, and removes and/or dissipates cord and other anomalies typically resulting from refractive index differences originating from compositional inhomogeneities. From stirring apparatus 16 the molten glass flows from stirring vessel outlet 56 through connecting tube 28 to collection vessel 18, and then through downcomer tube 20 to inlet 30 of forming body 22.

Figure 4:
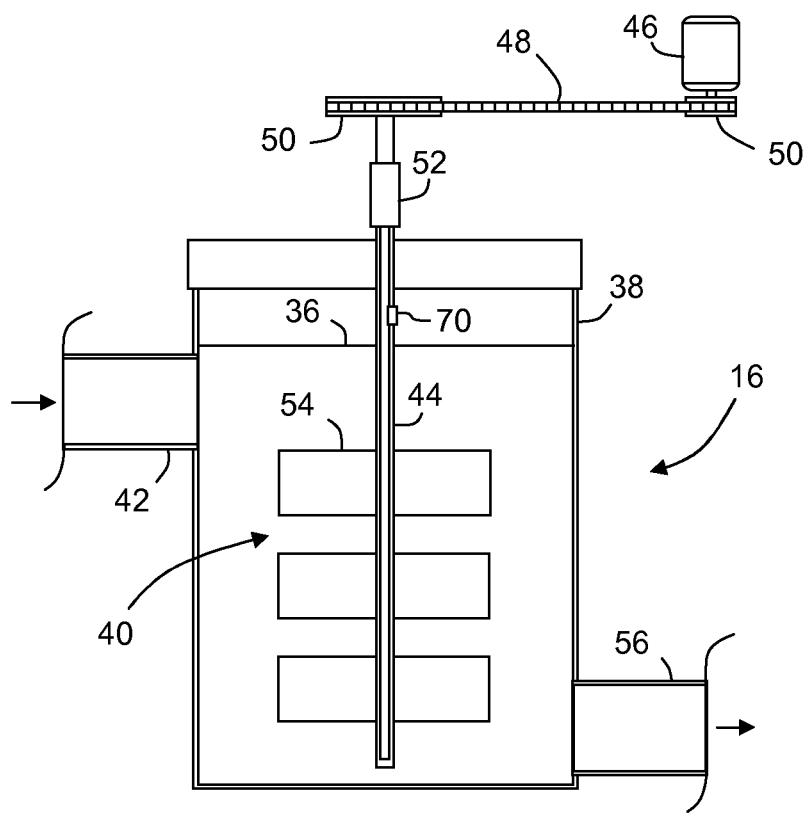
FIG. 4 is a cross sectional view of a stirring apparatus for homogenizing the molten glass as it flows through the platinum delivery system.

Each of the components of the platinum delivery system described above may be formed from smaller sub-components, and assembled, such as by welding. The following description will review assembly of stirring apparatus 16 (shown in FIG. 4), and in particular the stirrer 40, but it should be understood that the following principals can be applied to other components of the platinum system and are not limited to the stirrer or stirring apparatus.

Figure 5:
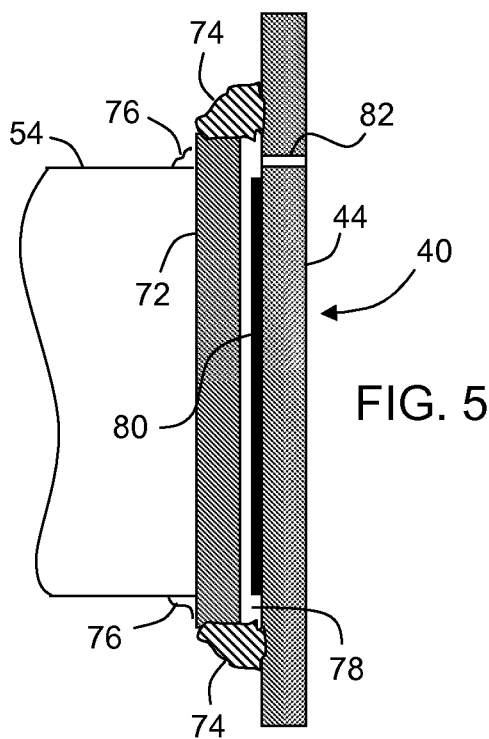
FIG. 5 is a close up cross sectional view of a portion of a stirrer shaft, showing the joining of several constituent pieces of the stirrer that creates an interstitial volume, and the positioning of an oxygen generating compound in the interstitial volume.

FIG. 5 depicts a portion of stirrer 40 where a stirrer blade 54 is attached to stirrer shaft 44. Stirrer shaft 44 may, in some embodiments, be a hollow cylinder, and can include multiple layers of a platinum-containing metal that form the wall of the hollow cylinder. For example, the platinum-containing metal may be a platinum rhodium (Pt—Rh) alloy, such as 80% platinum and 20% rhodium. Stirrer 40 may be formed for example, by a powder process and then mechanically shaped into tubes and sheet to make the shafts, blades and rims that form the stirrer. To simplify the illustration, the stirrer shaft depicted in FIG. 5 is of a single-wall design. Final assembly of the stirrer is typically by inert gas welding. As shown in FIG. 5, sleeve 72 is disposed about stirrer shaft 44 and welded thereto at welds 74. Stirrer blades 54 are then welded to sleeve 72 at welds 76. As shown, an interstitial space or volume 78 is disposed between the sleeve 72 and the outside surface of stirrer shaft 44. Mechanical jigs used to hold the component metal pieces in place during welding may be made of graphite or silicon carbide, and these can be a source of carbon contamination through rubbing or impact during assembly. Other factors such as incomplete cleaning or carbon-containing tramp gases in the inert welding gas may introduce carbon into interstitial volume 78 as well. For example, lubricants are routinely used during extrusion, rolling or pressing operations. Carbonaceous (carbon-containing) material comprising the lubricant can be trapped in the stirrer structure between the various layers of platinum-containing metal of the structure. If incompletely cleaned, such lubricants can also serve as carbon sources. Even milligram quantities of carbon sealed into welded cavities are undesirable because of the potential for $CO_2$ blistering.

A simple way to prevent blister problems resulting from carbon that may have been introduced during stirrer assembly is to vent the cavities and heat treat the completed stirrer in air or other oxidizing atmosphere. However, the gas path to supply $O_2$ and remove the generated $CO_2$ from a constricted space, such as between a blade sleeve and the shaft, can require a long heat time to completely burn out any reduced carbon.

In accordance with embodiments disclosed herein, to ensure all carbon is removed from assembled parts, an oxygen-supplying material 80, such as a multivalent compound (e.g. $SnO_2$), is included in the formed cavity before heat treatment. As used herein, a multivalent compound is an oxide compound comprising a constituent element capable of at least two electronic valence states. Such compounds, for example $SnO_2$, when heated, are known to change valence state and generate oxygen. It should be noted that other multivalent compounds, such as $Sb_2O_5$ and $As_2O_5$, may also be used. However, because arsenic and antimony compounds are toxic and pose health hazards to workers assembling the components, they are therefore not recommended.

As shown in FIG. 5, formed cavities, such as cavities formed by welding components together, can be vented by providing a vent passage 82 to provide a path for evolved gases to exit the cavity. In the case of fabricating a stirrer shaft, the shaft can be provided with a permanent vent passage 82 to the hollow shaft interior that ultimately leads to an external atmosphere, such as through vent 70. However, there are welded cavities on other component parts, such as on a rim of the stirrer blade, that cannot be vented to an atmosphere outside the stirring apparatus. The released oxygen then has the potential to distort the platinum around the cavity because of the poor mechanical strength of the platinum at elevated temperatures. Thus, care must be taken so that excessive $SnO_2$ does not remain in the cavity after the high temperature oxidation step. For these cases a vent hole can be provided, such as through the blade rim, and then heat treating the article. The vent hole can be closed with a small weld after the article is heat treated in an oxygen-containing atmosphere.

The amount of $SnO_2$ that should be added to the cavity area before welding can be determined from the amount of carbon contamination expected. Lab experiments indicate that milligram quantities of graphite in a sealed platinum (or platinum alloy) cavity will produce bubbles in the molten glass caused by carbon permeation through the platinum metal. If a milligram of carbon is trapped under a stirrer blade sleeve, for example, it corresponds to about 6 ppm carbon by weight, calculated on the basis of the sleeve weight. This amount would be difficult to detect by conventional means if the sleeve is analyzed after use. The amount of $SnO_2$ to include in the cavity to react with 1 mg graphite would be at minimum 12.5 mg $SnO_2$ for complete reaction. If the cavity will also be open to an oxidizing atmosphere, a larger quantity is not needed unless severe contamination is anticipated. The main function of the $SnO_2$ is to oxidize carbon located far from the vent. The pressure created by the evolved $CO_2$ will force the gas out of the cavity. In the event there is no tramp contamination in a sealed cavity, the materials are harmless to the precious metal component. $SnO_2$ will react to form $O_2$, Sn and SnO. The elemental Sn is soluble in platinum. However, by limiting the amount of $SnO_2$ powder, no liquid phases will form.

The oxygen-producing material 80 may be deposited as a powder coating, and can be applied, for example, by electrophoretic deposition, with the weld area masked to prevent weld contamination by oxides.

To ensure the removal of any residual carbonaceous material, the first assembly (e.g. joined sleeve 72 and stirrer shaft 44) can be heat treated by heating the assembly to a temperature of at least about 1450° C. for a period of time equal to or greater than about 12 hours in an atmosphere containing equal to or greater than about 20% by volume oxygen. The atmosphere may be air. Alternatively, the atmosphere may contain by volume≥30% oxygen, ≥40% oxygen, ≥50% oxygen, ≥60% oxygen, ≥70% oxygen, ≥80% oxygen, ≥900% oxygen or even 100% oxygen. In some embodiments, the temperature can be as high as 1600° C. or even 1650° C. However, care should be taken not to cause oxidation damage to the assembly, so the temperature and oxygen content should be appropriately balanced. The time period can be extended, based, among other things, on the thicknesses of the sleeve and or shaft, to as long as, for example, 72 hours or even longer. It should be noted that the heat treating step described above is distinguished from conventional annealing steps that may subject the platinum-containing member to a maximum temperature of about 1000° C. to about 1200° C. for short periods of time, on the order of an hour or less, as such annealing steps are not sufficient to remove carbon that has been dissolved within the platinum-containing member. Once heat treatment has been completed, the vent may be plugged if the vent would be open to molten glass during operation in the glass making process, or left open if the vent leads to an exterior atmosphere and is therefore not open to the molten glass.

Figure 6:
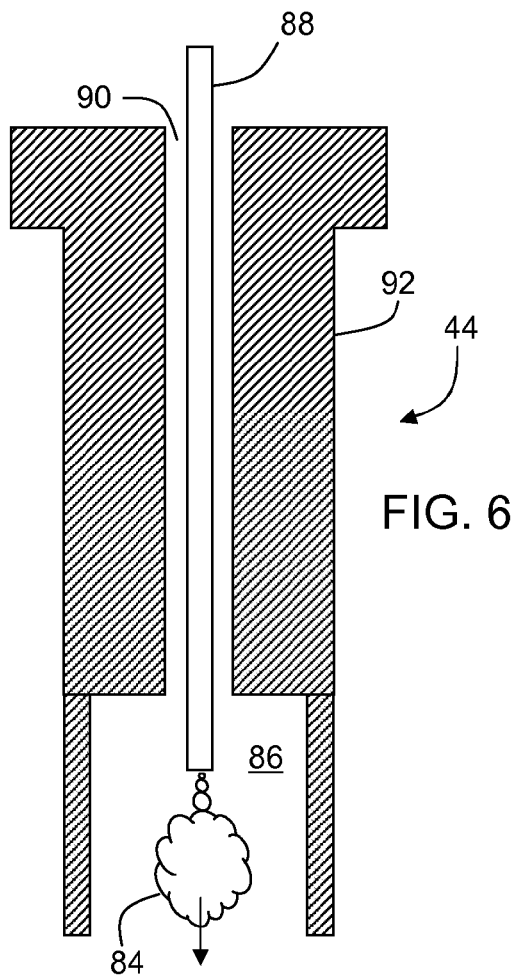
FIG. 6 is a cross sectional view of a portion of a stirrer shaft showing the insertion of a gas supply tube through an upper vent passage of the sitter shaft into a hollow interior portion of the shaft.

In an embodiment shown in FIG. 6 a positive atmosphere control system in which a gas 84 containing oxygen, e.g. air or $O_2$ gas, is directed into hollow interior portion 86 of stirrer shaft 44 through a gas supply tube 88 extending through upper stirrer vent passage 90. Preferably gas supply tube 88 is coaxial with the stirrer shaft. The stirrer shaft preferably comprises a cylindrical cross sectional shape. The gas is pressurized above ambient atmospheric pressure to ensure a positive flow into and out of stirrer interior 86. By doing this, it is not necessary to rely on diffusion either to supply oxygen to the stirrer interior or to remove any reaction products of carbon-containing materials and oxygen. In a preferred embodiment gas supply tube 88 is machined into the center of the high temperature alloy that comprises stirrer coupling 92, e.g. a stainless steel or Inconel alloy, and the gas supply tube is made from the same or similar material. Although gas supply tube 88 supplying the $O_2$-containing gas will be cooled by the incoming flow of gas, it will be heated by the return gas from hollow stirrer interior 86, thus necessitating a high temperature material for the gas supply tube. Gas flow is controlled to a low level, in a range from about 0.5 to about 1.5 liter/min to minimize heating of the gas supply components, including the gas supply tube itself. This flow is sufficient to give a turnover time of several minutes, which should be adequate to oxidize (burn off) any errant carbon-containing contamination in a short time.

Figure 7:
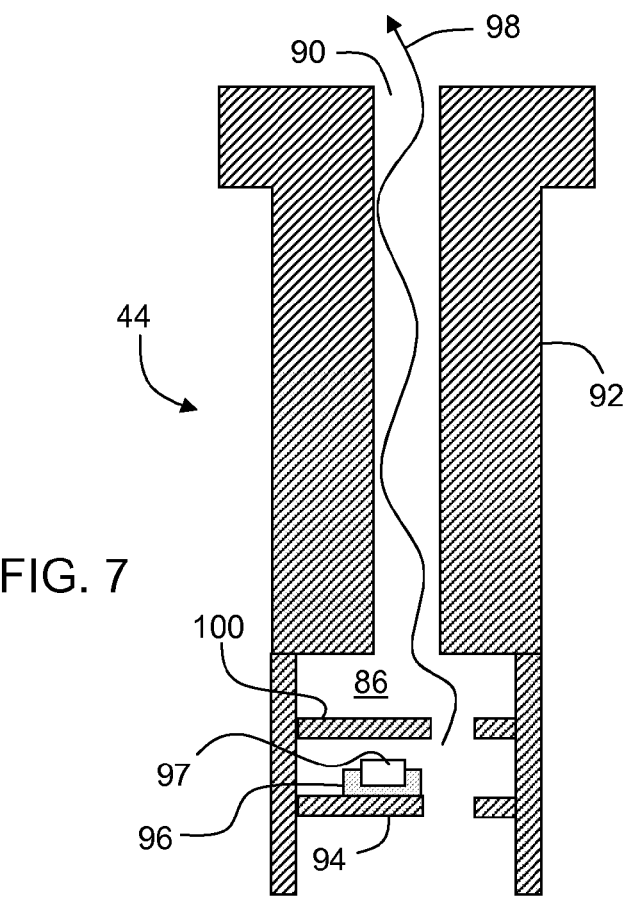
FIG. 7 is a cross sectional view of a portion of a stirrer shaft showing an oxygen-producing material positioned within a hollow interior portion of the shaft such that when the shaft is heated, such as being in contact with molten glass, the oxygen-producing material produces oxygen.

An alternative or augmentation to a positive oxidizing gas flow is the insertion of an oxidizing material to the hollow stirrer interior 86. In accordance with FIG. 7 showing a portion of a stirrer shaft 44, a platinum support 94 is attached, such as by welding, to the inner wall surface of shaft 44 at a location above the molten glass level but below the stirrer cover (i.e. in the heated region of the molten glass stirring chamber, not shown). In one embodiment a refractory container 96, such as a crucible formed from alumina, and containing oxidizing material 97, is placed on support 94. Oxidizing material 97 may be a metal oxide such as, for example, $SnO_2$. At 1425° C. the refractory of the crucible and the oxidizing material 97 will not form a liquid phase and therefore will remain substantially separate. If carbon-containing material is present in hollow shaft interior 86, reduced carbon vapors will react with the oxidizing material 97, which will vaporize. For example, tin oxide will vaporize to produce $CO_2$ (reference number 98) and Sn metal or SnO. In the case of tin oxide, the tin vapors will deposit on the inside of the shaft wall, dissolve into the platinum or platinum alloy of the shaft and diffuse into the glass melt where they can react to form tin oxide dissolved in the melt. The solubility of Sn in platinum at stirrer operating temperatures is several percent, so by distributing the vapors in the shaft volume the danger of platinum failure is minimized or eliminated. The location and temperature of oxidizing material 97 should be selected to balance an efficient reaction with carbon with the possibility that material evaporating from the oxygen-supplying material will condense around the upper shaft vent passage 90 and plug the vent passage. For example, a thermal radiation shield 100 can be positioned between support 94 (including container 96 and oxidizing material 97) and vent passage 90. Thermal radiation shield 100 is preferably perpendicular with the stirrer shaft wall and is circular in shape. Thermal radiation shield 100 and the upper shaft walls minimize blockage of the vent passage by providing an intervening lower temperature surface for condensation of the tin or other vaporized material.

It should be emphasized that the above-described embodiments of the present invention are merely possible examples of implementations set forth for a clear understanding of the principles of the invention. Many variations and modifications may be made to the above-described embodiments of the invention without departing substantially from the spirit and principles of the invention. For example, while the above description has been presented in terms of a stirrer shaft, the principals described can be applied to other single or multi-layer platinum-containing components of a glass making apparatus that come into contact with molten glass, including but not limited to single or double-walled tubes or pipes used to transport the molten glass from one location to another location, vessels for conditioning the molten glass, and sub-assemblies of certain components, such as stirrer blades coupled or uncoupled to the stirrer shaft. All such modifications and variations are intended to be included herein within the scope of this disclosure and the present invention and protected by the following claims.

What is claimed is:

1. A method of removing carbon contamination from an interior volume of a platinum-containing component comprising:
   providing a platinum containing component comprising a hollow interior portion and a passage extending between an ambient atmosphere outside the platinum containing component and the hollow interior portion;
   positioning a gas supply tube into the hollow interior portion through the passage;
   flowing an oxygen-containing gas through the gas supply tube into the interior hollow portion of the platinum-containing component such that a pressure within the hollow interior portion of the platinum-containing component is greater than a pressure of the ambient atmosphere; and
   heating the platinum containing component to a temperature greater than about 1400° C.

2. The method according to claim 1, wherein the platinum-containing component is in contact with a molten glass material during the heating.

3. The method according to claim 1, wherein the platinum-containing component is a shaft of a glass stifling apparatus.

4. The method according to claim 1, wherein the gas supply tube does not contain platinum.

5. The method according to claim 2, wherein at least a portion of the platinum-containing component is immersed in a molten glass material.

6. A method of removing carbon contamination from an interior volume of a platinum-containing component comprising:
provided a platinum containing component comprising a hollow interior portion and a passage extending between an ambient atmosphere outside the platinum containing component and the hollow interior portion;
positioning an oxidizing material powder within the hollow interior portion; and
heating the platinum containing component to a temperature greater than about 1400° C. such that the oxidizing material reacts with reduced carbon to produce $CO_2$ and a metal vapor.

7. The method according to claim 6, wherein the platinum-containing component is in contact with a molten glass material during the heating.

8. The method according to claim 6, wherein the oxidizing material is a metal oxide.

9. The method according to claim 8, wherein the metal oxide is $SnO_2$.

10. The method according to claim 6, wherein the oxidizing material is contained within a refractory container.

11. The method according to claim 10, wherein the refractory container comprises alumina.

12. The method according to claim 6, wherein a thermal radiation shield is positioned between the oxidizing material and an ambient atmosphere outside the platinum-containing component.

* * * * *